United States Patent [19]

Gotoh et al.

[11] Patent Number: 4,529,055
[45] Date of Patent: Jul. 16, 1985

[54] MOTOR VEHICLES

[75] Inventors: Isamu Gotoh, Kiyose; Masaki Watanabe, Urawa; Goroei Wakatsuki; Hiroshi Shimoyama, both of Fujimi; Masakazu Matsuzawa, Kokubunji, all of Japan

[73] Assignee: Honda Giken Kogyo Kabushiki Kaisha, Tokyo, Japan

[21] Appl. No.: 576,804

[22] Filed: Feb. 6, 1984

Related U.S. Application Data

[63] Continuation of Ser. No. 380,338, May 20, 1982, abandoned, which is a continuation of Ser. No. 136,567, Apr. 2, 1980, abandoned.

[30] Foreign Application Priority Data

Apr. 2, 1979 [JP] Japan .............................. 54-39495[U]
Apr. 9, 1979 [JP] Japan .............................. 54-46630

[51] Int. Cl.³ .............................................. B62K 5/04
[52] U.S. Cl. .................................. 180/210; 180/297; D12/110
[58] Field of Search .............. D12/85, 110; 180/210, 180/215, 217, 297, 291; 280/282

[56] References Cited

U.S. PATENT DOCUMENTS

| D. 228,751 | 10/1973 | Kouri ................. | D12/85 X |
| D. 242,439 | 11/1976 | Gervais .............. | D12/85 X |
| D. 255,111 | 5/1980 | Palmer ................ | D12/85 X |
| D. 264,953 | 6/1982 | Shimoyama .......... | D12/110 |
| 3,504,934 | 4/1970 | Wallis ................. | 180/217 X |
| 3,605,929 | 9/1971 | Rolland .............. | 280/282 X |
| 3,776,353 | 12/1973 | Roth .................. | 180/215 |
| 3,857,584 | 12/1974 | Nohava et al. ...... | 280/293 |
| 3,938,609 | 2/1976 | Kensaku et al. ..... | 180/210 |
| 4,006,916 | 2/1977 | Patin .................. | 180/215 X |

FOREIGN PATENT DOCUMENTS

| 548679 | 1/1923 | France ............... | 180/215 |
| 532921 | 2/1941 | United Kingdom ... | 180/215 |

Primary Examiner—Joseph F. Peters, Jr.
Assistant Examiner—Michael Mar
Attorney, Agent, or Firm—Irving M. Weiner; Pamela S. Burt

[57] ABSTRACT

A vehicle having a pair of transversely spaced apart wheels, and a driving unit disposed between such wheels; at least the heat generating parts of the driving unit, such as an engine cylinder, being confined within an area defined by and between the contour of such wheels in profile. With such arrangement, protection of the driving unit, compact construction thereof, and effective utilization of the dead space in the vehicle can be attained.

7 Claims, 9 Drawing Figures

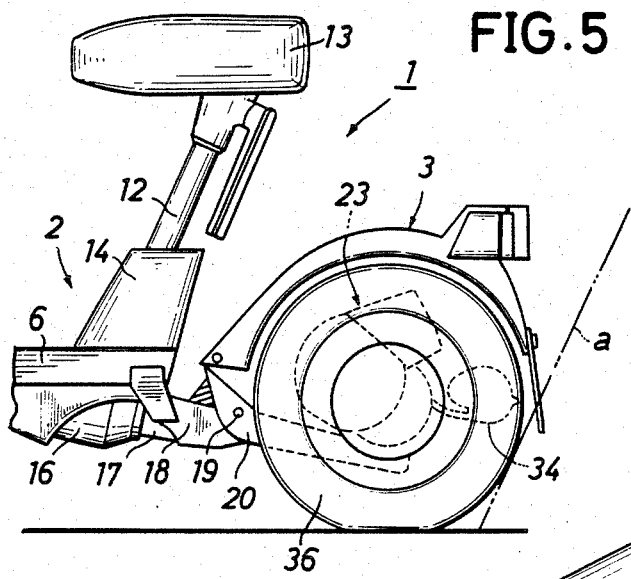
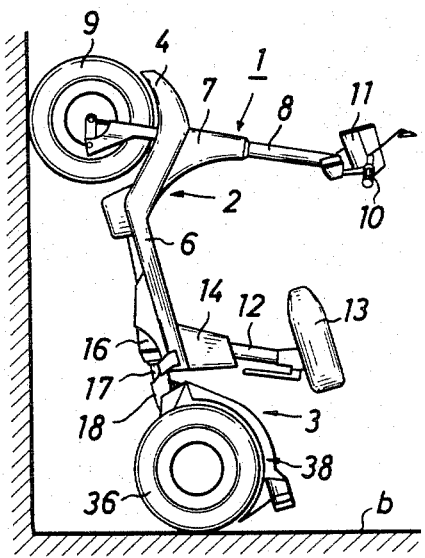
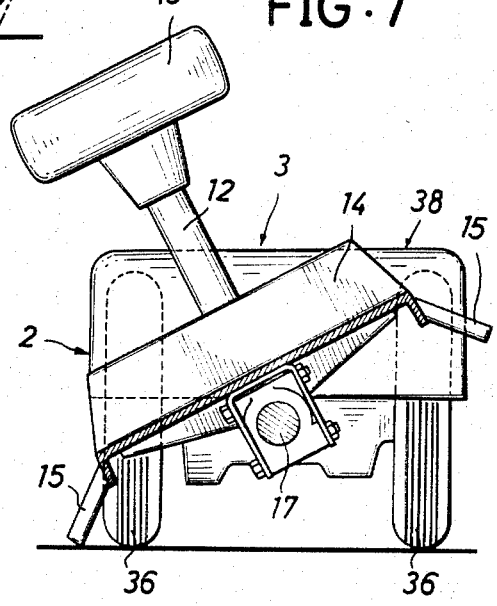

MOTOR VEHICLES

This is a continuation of application Ser. No. 380,338 filed May 20, 1982 now abandoned, which is in turn a continuation of application Ser. No. 136,567 filed Apr. 2, 1980, now abandoned.

TECHNICAL FIELD

The present invention relates to a light vehicle propelled by a motor carried thereon.

BACKGROUND OF THE INVENTION

There are known small and simple motor vehicles having a pair of transversely spaced apart wheels, including three-wheeled motor vehicles.

Known three-wheeled vehicles of the aforesaid type have a large carrier in the rear end portion of the vehicle body. This carrier increases the horizontal dimensions of the vehicle body in the vicinity thereof, and the length and width of the vehicle. The increased dimensions make the vehicle awkward to handle and operate. They are heavy in weight, and are, therefore, still more awkward to handle. The driving unit requires a large space for mounting relative to the vehicle body, and elevates the center of gravity of the vehicle considerably, thereby increasing its inertial mass. This obstructs the driving performance of the vehicle. Accordingly, it has been impossible to obtain three-wheeled motor vehicles which are light and comfortable to ride on, and easy to handle and drive, as opposed to two-wheeled vehicles.

The present invention is directed toward effectively solving the aforementioned problems.

SUMMARY OF THE INVENTION

The present invention provides a vehicle having a driving unit, including an engine mounted between a pair of transversely spaced apart wheels so that at least the heat generating parts of the driving unit, such as the engine cylinder, may be confined within the area surrounded by the contour of the wheels in its profile. A suction device including a carburetor mounted in front of the cylinder and an exhaust system mounted preferably behind the cylinder are also accommodated within the area. The pair of transversely spaced apart wheels have a track which is equal to or less than the wheel diameter. The vehicle includes a front body having one front wheel and a rear body having a pair of rear wheels, the front body being swingably connected to the rear body and including a flat floor having a width approximately equal to the track of the rear wheels to equalize the width of the front and rear bodies.

It is therefore an object of the invention to provide a motor vehicle having a compact driving unit which is sufficiently protected from external forces and reduces the dimensions of the vehicle body in its length and width.

Another object of the invention is to provide a motor vehicle which is light in weight and easy to handle and operate, and which can be driven as easily as a vehicle having an integral body of equal width along the entire length thereof.

BRIEF DESCRIPTION OF THE DRAWINGS

FIGS. 5 and 6 are views illustrating the storage capacity of the vehicle.

FIG. 7 is a view illustrating the function of a bank sensor.

DETAILED DESCRIPTION OF THE PREFERRED EMBODIMENTS

Figure 3:
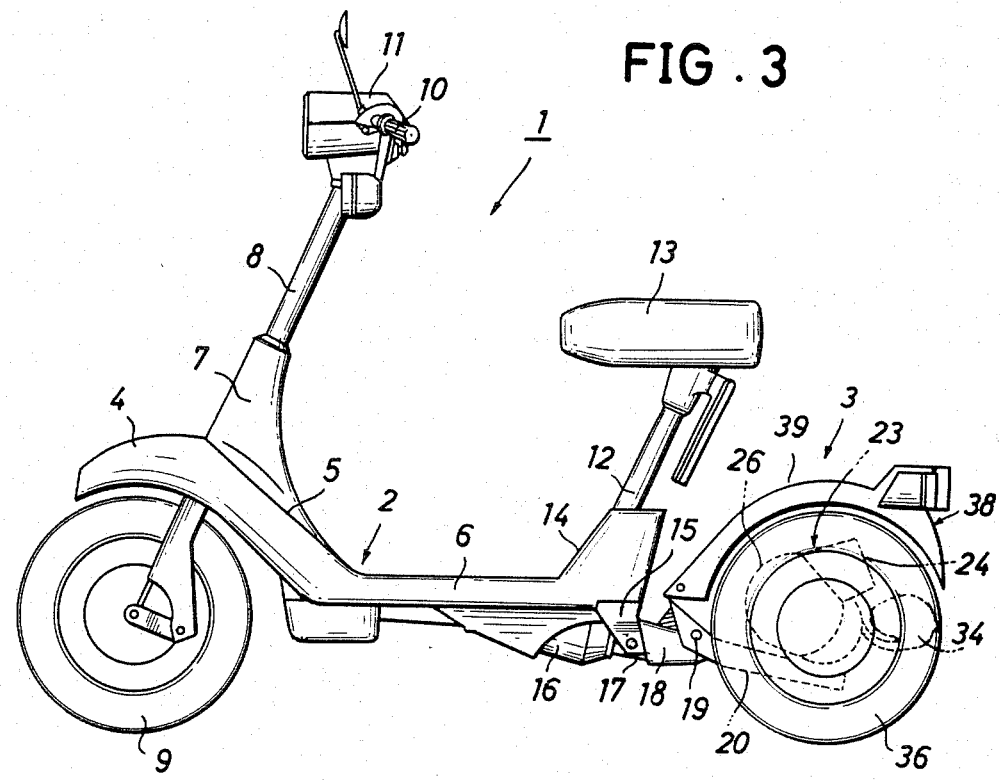
FIG. 3 is a schematic side elevational view of a three-wheeled vehicle in which the present invention is embodied.
Figure 4:
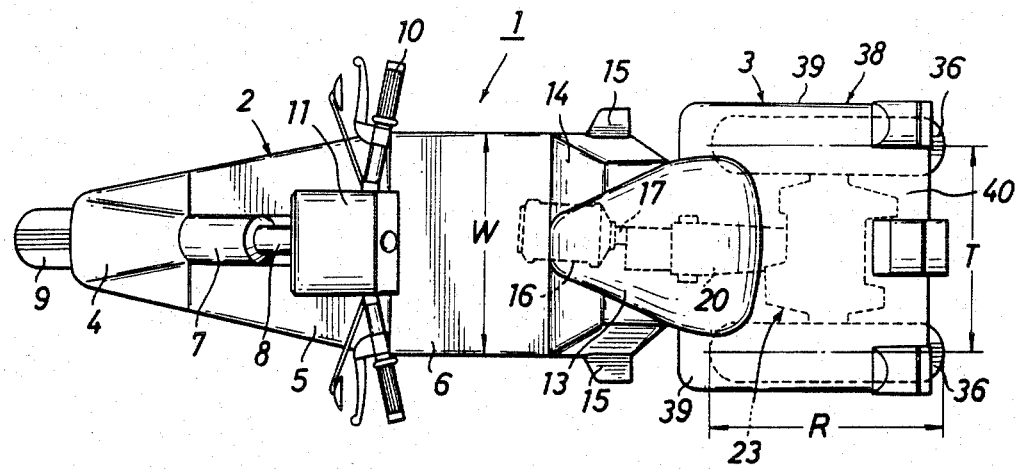
FIG. 4 is a top plan view of the vehicle shown in FIG. 3.

Referring to FIGS. 3 and 4, there is shown a three-wheeled vehicle 1 which comprises a front body portion 2 and a rear body portion 3. The front body portion 2 has a low-floored construction, and includes a front fender 4 at the forward end thereof, a rearwardly and downwardly inclined guard 5 extending from the rear end of the fender 4, and a flat floor-like footrest 6 extending rearwardly from the rear end of the inclined guard 5 and having a low level of height. The footrest 6 has a width which is sufficient for the driver to position his feet side by side thereon, and which is approximately equal to the width of the driver's body. A steering column support 7 extends upwardly from the front inclined guard 5 at an inclination.

A steering column 8 extends longitudinally through the support 7, and has in its lower end a fork 8a which supports a front steering road wheel 9. The steering column 8 is provided on its upper end with a tiller bar or handlebar 10 and a casing 11 holding a headlight, instruments, etc. therein. A seat post 12 extends upwardly from the rear end of the front body portion 2, and carries a substantially saddle shaped driver's seat 13 thereon.

A transverse wall 14 extends upwardly from the rear end of the footrest 6, and has a length which exends along the full width of the footrest 6. The wall 14 serves as a foot guard which prevents rearward displacement of the feet positioned on the footrest 6, whereby interference of the feet with the rear body portion 3, which is rollable relative to the front body portion 2, can be completely prevented.

A pair of downwardly inclined winglike members 15 project from the bottom of the wall 14 on either side thereof to act as a bank sensor. The sensor members 15 define the rolling limits for the front body portion 2 relative to the rear body portion 3. When the front body portion 2 has rolled into to its rolling limit on either side of the vehicle, one of the sensor members 15 srikes against the road surface as shown in FIG. 7, and warns the driver of the vehicle by the impact.

The front body portion 2 is rotatably connected to the rear body portion 3. The rear body portion 3 comprises a rear subframe 18 connected to a swivel shaft 17 of a swivel joint 16 provided on the underside of the front body portion 2 at the rear end thereof.

Figure 1:
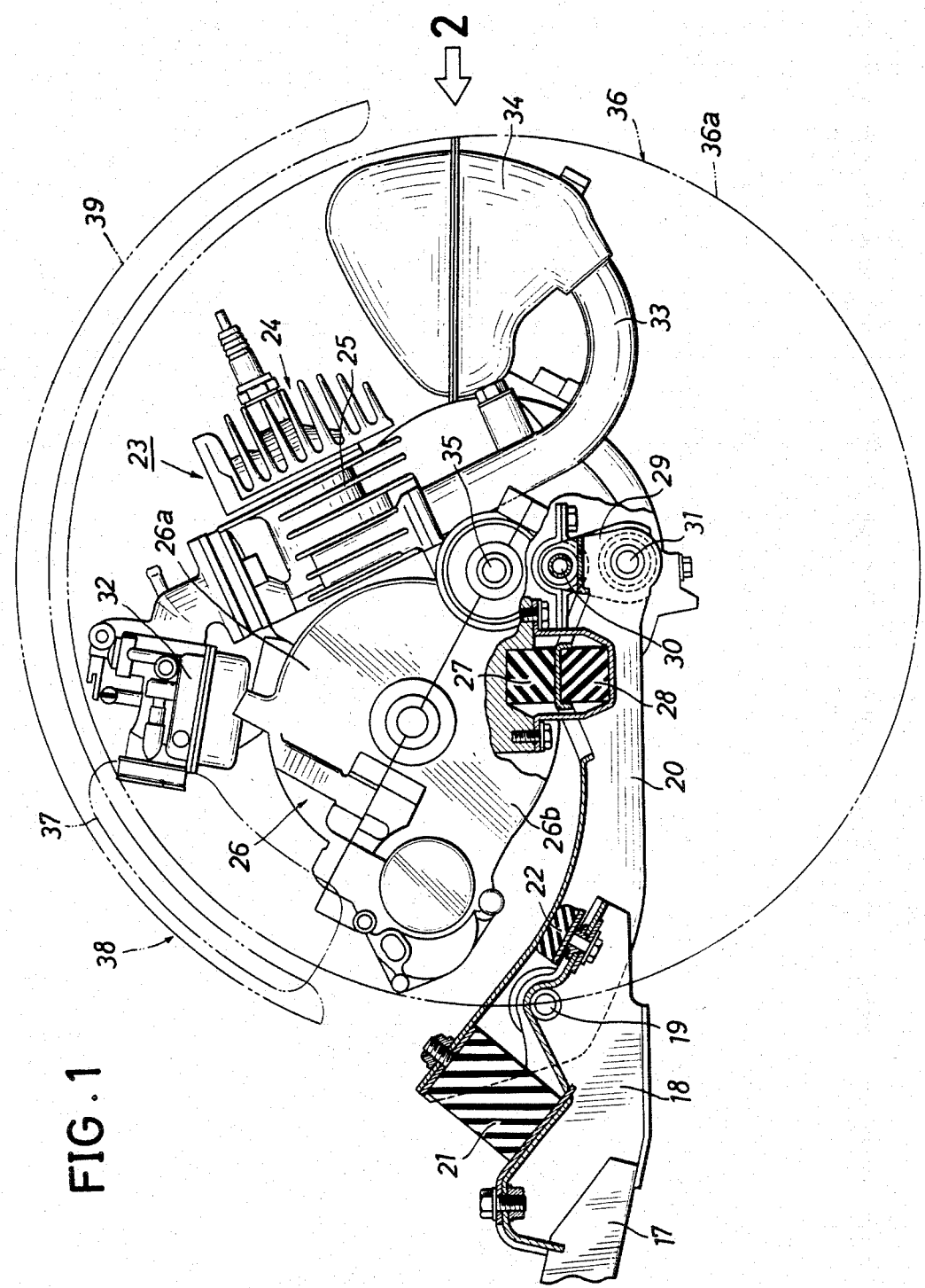
FIG. 1 is a fragmentary side elevational view showing the driving unit portion of a vehicle partly in section.
Figure 2:
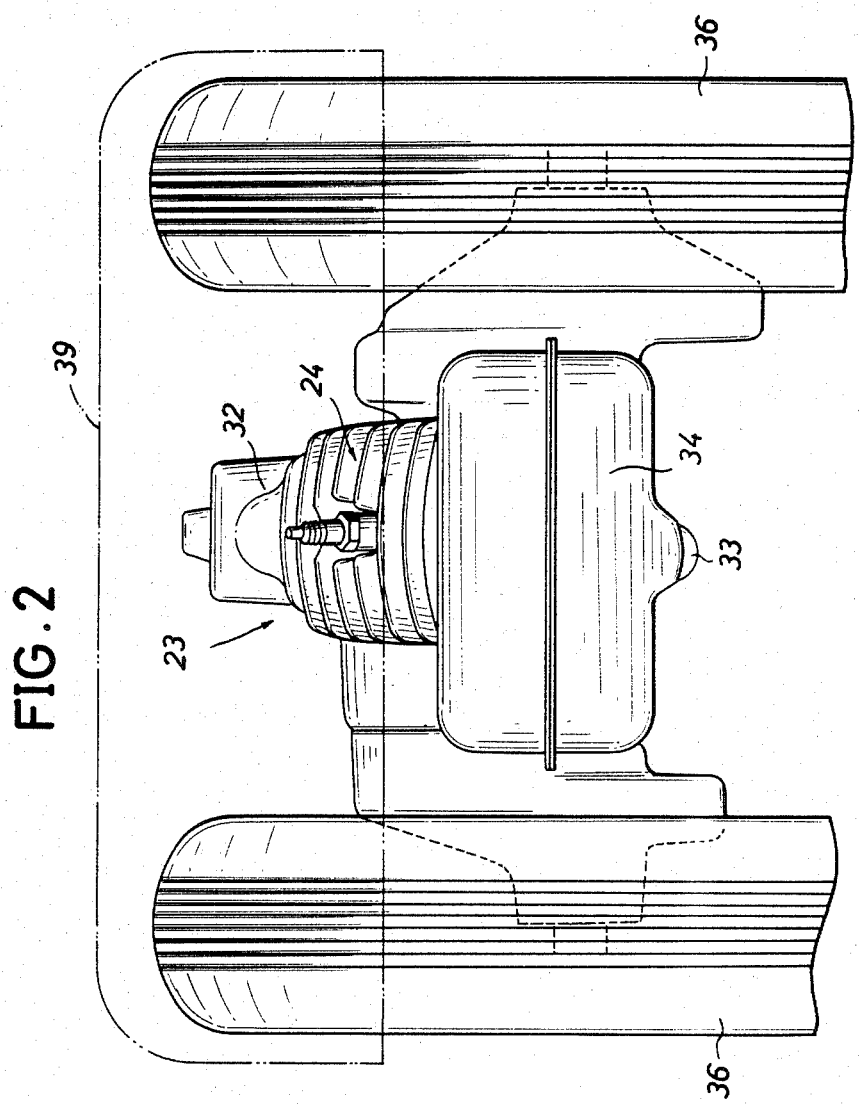
FIG. 2 is a rear end view taken in the direction of arrow 2 in FIG. 1.

The rear subframe 18 has a front end secured to the rear end of the swivel shaft 17, and is provided at its rear end with a transverse pin 19, as shown in FIG. 1. A rear body 20 has a front end portion rotatably supported on the pin 19, and is rotatable about it. A mass of rubber 21 defining a cushion unit is disposed between the top of the rear subframe 18 and the bottom of the rear body 20 in front of the pin 19, A rebound rubber stop 22 is provided on the subframe 18 behind the pin 19, and carries thereon a portion of the rear body 20 which is located behind the pin 19.

A driving unit 23 is mounted on the rear body 20, and comprises an engine 24 and its associated devices. The engine 24, which forms an essential part of the driving unit 23, comprises a cylinder 25, and a casing 26 housing therein a crankshaft, a transmission mechanism, a speed change mechanism, etc. The casing 26 comprises upper and lower halves 26a and 26b which are separable from each other along a central plane. The cylinder 25 is connected to the upper half 26a of the casing 26. The casing 26 has a rear portion connected to the rear end of the rear frame 20 by a pair of rubber mounting pieces 27 and 28 disposed one above the other. The rear end of the casing 26 is connected to the rear end of the rear body 20 by a link 29, pins 30 and 31, and a rubber bush (not shown). The rubber pieces 27 and 28, and the link 29 effectively absorb and dampen the vibration of the engine 24 and the reaction force from the road surface.

The cylinder 25 has a longitudinal axis inclined rearwardly, and a carburetor 32 is mounted upwardly and forwardly of the cylinder 25. An exhaust pipe 33 and a muffler 34 are disposed downwardly and rearwardly of the cylinder 25. A transversely extending rear wheel axle driving shaft 35 is provided at the rear end of the casing 26, and a pair of opposite ends 35a of the driving shaft 35 project outwardly from the opposite sides of the casing 26, and carry a pair of rear driving wheels 36, respectively, thereon. Thus, the driving unit 23 is disposed between the rear wheels 36. In FIG. 1, numeral 37 denotes an air cleaner connected to the inlet of the caburetor 32.

The heat generating part of the driving unit 23, i.e., the cylinder 25, is confined within the area defined by the outer peripheral edges or contours of the wheels 36 in profile, as shown in FIG. 1. The cylinder 25 is completely concealed behind either of the wheels 36 when viewed on either side of the vehicle. The underside of the cylinder 25, which is rearwardly inclined, is protected by the casing 26 disposed under the cylinder 25, and the rear body 20 disposed under the casing 26. The cylinder 25 is also protected on both sides thereof by the rear wheels 36 between which it is concealed. The top of the cylinder 25 is protected by a rear fender 38 which is disposed above the cylinder 25. Accordingly, the cylinder 25 is not exposed, but is protected from the exterior of the vehicle, so that there is no fear of a hand or the like being inadvertently brought into contact with the heat generating part of the driving unit. Preferably, the carburetor 32, the exhaust pipe 33 and the muffler 34 are also confined within the contours of the wheels 36 when viewed in side elevation, so that they may be protected on either side thereof.

As described above, driving unit 23 comprises: the casing 26 housing therein at least a crankshaft and transmission; engine 24 with cylinder 25 thereof extending upwardly from casing 26 and inclined rearwardly; and the exchaust system, including exhaust pipe 33 and muffler 34, disposed downwardly and rearwardly of cylinder 25. The casing 26, cylinder 25 and the exhaust system of driving unit 23 are arranged forwardly of rear wheel axle, above the axle, and behind the axle, respectively, as shown in FIG. 1. Thus, each part of driving unit 23 is arranged about and in close proximity to the rear wheel axle, all within the area defined between the contours of the relatively small wheels 36.

The entire driving unit 23 is mounted within the area defined between the space between the wheels 36, thereby making effective use of such space, which would otherwise remain vacant. And the resulting confinement of the various parts of the driving unit 23 within the area defined between the contour 36a of the rear wheels 36 contributes to making the construction of the vehicle compact, and ensures protection of the driving unit against any undesirable interference from the outside.

The rear fender 38 comprises a pair of mutually spaced apart fender portions 39 lying over the rear wheels 36, respectively, and a cover 40 connected between the fender portions 39. The various parts of the fender 38 may be formed as an integral unit as a whole, or separately for later integral connection. The fender 38 is supported on the casing 26 for the driving unit 23, or the rear frame 20. The cover 40 extends over the driving unit 23. The air cleaner 37 connected to the carburetor 32 is disposed under the fender 38, and protected by it. Thus, the entire driving unit 23 is confined within the fender 38.

According to another aspect of the present invention, the rear wheels 36 have a track T which is equal to, or smaller than, the diameter R of the wheels 36. Thus, the rear body portion 3 has a width which is approximately equal to that of the front body portion 2, hence the width of the rider's body. Therefore, although the vehicle of this invention is a three-wheeled one, it is nearly equal in width to a two-wheeled vehicle, and is easy and smooth to handle without any interference of the rear wheels 36. As is obvious from FIG. 4, the track T is nearly equal to the width of the seat 13, whereby a three-wheeled vehicle having a rear body portion which is as narrow as a two-wheeled vehicle, or scooter can be obtained according to this invention.

The track T is also approximately equal to the width W of the footrest 6 in the front body portion 2, and the width of the rear body portion 3, including the fender 38, is nearly equal to that of the front body portion 2. The rear body portion 3 does not substantially protrude transversely relative to the front body portion 2, and the width of the rear body portion 3 does not appreciably differ from the distance between the driver's feet placed on the footrest 6. Accordingly, the driving feeling which the rider of the three-wheeled vehicle according to this invention may have with respect to its width is substantially equal to that of a person riding on a two-wheeled vehicle.

In operation, the driving unit 23 is started to drive the rear wheels 36, so that the vehicle may be propelled. The rider sitting on the seat 13 holds the handlebar 10, with his feet being placed side by side on the footrest 6, and moves the vehicle as if he were riding on a scooter. Because the track T is equal to or even smaller than the diameter of the wheels 36, and in this sense, the vehicle of the present invention does not differs substantially from a two-wheeled vehicle, the rider can drive it as if he were handling a two-wheeled vehicle, while being assured that the two rear wheels prevent the vehicle from falling. The rear body portion is constituted by the rear fender, and is not intended to carry any load thereon, according to the present invention. Any such load may be placed in a basket or like container at the front end of the vehicle, as is done on some types of moped or two-wheeled motor vehicles.

The arrangement described above for mounting the driving unit does not merely provide protection therefor, but also contributes to effectively utilizing the dead space between the wheels. Because the driving unit is accommodated within the area defined between the contours of the rear wheels, it can be made as compact in construction as practically possible. Accordingly, the length of the rear body portion can be reduced to the extent that it is only slightly greater than the diameter of the wheels, whereby the overall dimensions of the vehicle can be reduced as much as possible. The vehicle as a whole can be reduced in weight. The fenders are no longer undesirably large, but can be reduced in size and weight.

As described hereinabove, the driving unit 23 is disposed about the driving shaft 35, and confined within the area defined between the contours of the rear wheels 36. This means that the driving unit 23, which is heavy in weight, is provided at a low level of height, thereby lowering the center of gravity of the vehicle. When the rider rides on the vehicle as if on a scooter, it remains highly stable in its upright position despite the small track between the rear wheels. The vehicle is not substantially affected by inertial mass when it turns, and remains highly stable during its running.

The advantages of the present invention also manifest themselves when the vehicle is garaged or otherwise parked. As shown in FIG. 5, the rear wheels 36 can be kept in contact with a wall a of a garage or parking place, because the muffler 34 is concealed within the contour of the wheels 36, when viewed from its side, and does not interfere with the wall a. Alternatively, the vehicle can be kept standing against the wall with its front end facing upwardly, as shown in FIG. 6. This mode of storage is very convenient, because the driving unit 23 is concealed within the contour of the rear wheels 36, and neither it nor the muffler will contact the floor f.

As described hereinabove the wall 14 prevents any rearward displacement of the rider's feet, as well as any interference thereof with the rear body portion 3 when the front body portion 2 has rolled, and the rolling limits of the front body portion 2 are detected by the bank sensor 15.

Figure 8:
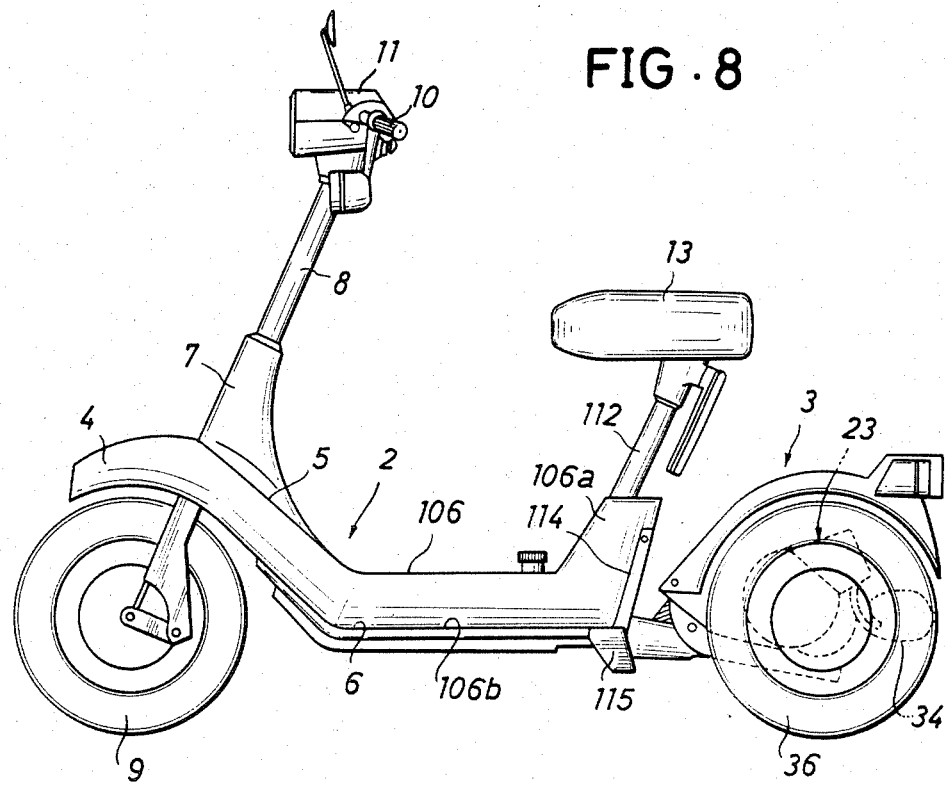
FIGS. 8 and 9 are views similar to FIGS. 3 and 4, respectively, and showing a modified form of the vehicle shown therein.
Figure 9:
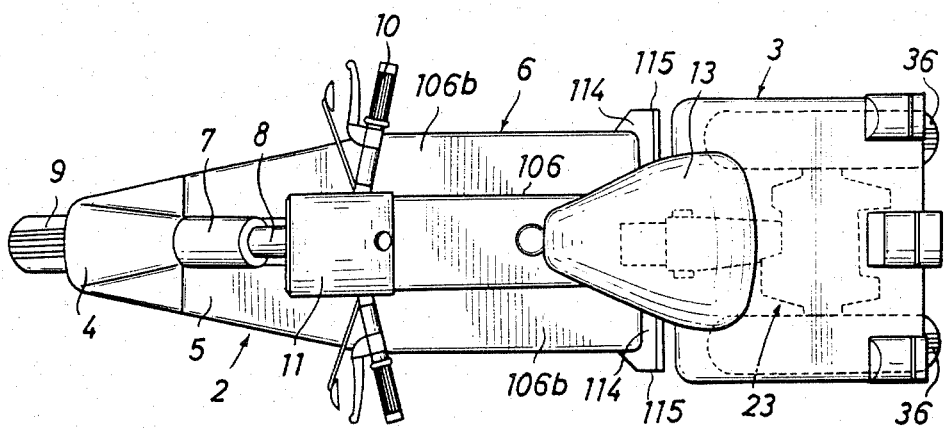

Attention is now directed to FIGS. 8 and 9 showing a modified form of the vehicle according to the present invention. A footrest defining floor portion 6 is provided with a centrally and longitudinally extending projection 106 having a predetermined width, and a supporting base 106a for a seat post 112 extends upwardly from the rear end of the projection 106. A pair of flat surfaces on the opposite sides of the projection 106 define a pair of footrests 106b. A transverse plate wall 114 extends upwadly from the rear end of each footrest 106b.

The walls 114 protrude outwardly from the opposite side edges of the projection 106 at the rear end thereof. The walls 114 are each provided with an outwardly and downwardly inclined extension which defines a bank sensor 115. The other parts of the vehicle shown in FIGS. 8 and 9 are equal to their counterparts in FIGS. 3 and 4. They are shown by the same numerals as those used in FIGS. 3 and 4, and the description thereof is thus omitted.

While the present invention has been described with reference to particular embodiments directed to three-wheeled vehicles, it is obvious that the invention can also be embodied in a four-wheeled vehicle having two front wheels and two rear wheels.

We claim:

1. A three-wheeled motor vehicle, comprising:
a front body having one front wheel;
a floor portion defined by a part of said front body;
a saddle seat supported by said front body;
a rear subframe connected to and rollable relative to said front body about a longitudinal axis of the vehicle;
a rear body swingably supported by said rear subframe about a transverse axis of the vehicle;
resilient means located between said rear subframe and said rear body for resiliently biasing any vertical swinging movement of said rear body with respect to said rear subframe;
a pair of rear wheels supported on said rear frame, the track between said rear wheels being substantially equal to the width of said saddle seat;
said floor portion having a width which is substantially equal to said track between said rear wheels;
a driving unit disposed between said rear wheels, said driving unit being provided with heat generating parts including an engine, cylinder, a suction device including a carburetor and an exhaust system including a muffler;
said driving unit being confined in its entirety within an area defined by the contour of said rear wheels in profile;
said track between said rear wheels being substantially equal to, or less than, the diameter of said rear wheels;
said rear body including a rear fender comprising a pair of spaced apart fender portions extending over said rear wheels, and a cover portion disposed between said pair of fender portions and integrally connected therewith; and
said cover portion extending over said driving unit.

2. A motor vehicle according to claim 1, wherein:
said driving unit comprises:
a casing housing therein at least a crankshaft and transmission;
said engine cylinder extending upwardly and rearwardly from said casing; and
said exhaust system being disposed downwardly and rearwardly of said cylinder; and
said driving unit is arranged about and in close proximity to an axle of said rear wheels, such that said driving unit is confined in its entirety within said area defined by the contour of said rear wheels in profile, with
said casing, said cylinder and said exhaust system being respectively arranged substantially in front of, above, and behind said rear wheel axle.

3. A motor vehicle according to claim 1, wherein:
said rear fender is disposed in its entirety a substantial distance below the level of said saddle seat.

4. A motor vehicle according to claim 1, wherein:
said floor portion is provided at its rear end with a wall which prevents rearward displacement of the driver's feet resting on said floor portion.

5. A motor vehicle according to claim 1, wherein:
said floor portion is provided at its rear end with laterally or downwardly extending bank sensor means adapted to contact the road surface when said front body rolls to its rolling limit.

6. A three-wheeled motor vehicle, comprising:
a front body having one front wheel;

a floor portion defined by a part of said front body;
a saddle seat supported by said front body;
a rear subframe connected to and rollable relative to said front body about a longitudinal axis of the vehicle;
a rear body swingably supported by said rear subframe about a transverse axis of the vehicle;
resilient means located between said rear subframe and said rear body for resiliently biasing any vertical swinging movement of said rear subframe;
a pair of rear wheels supported on said rear frame, the track between said rear wheels being substantially equal to the width of said saddle seat;
said floor portion having a width which is substantially equal to said track between said rear wheels;
a driving unit disposed between said rear wheels, said driving unit being provided with heat generating parts including an engine, cylinder, a suction device including a carburetor and an exhaust system including a muffler;
said driving unit being confined in its entirety within an area defined by the contour of said rear wheels in profile;
said track between said rear wheels being substantially equal to, or less than, the diameter of said rear wheels;
said rear body, said rear subframe, said rear wheels and said driving unit together defining a rear vehicle portion which has the uppermost part thereof disposed a substantial distance below the level of said saddle seat.

7. A motor vehicle according to claim 6, wherein:
the axle of said rear wheels is arranged at a level substantially at or near the level of said floor portion.

* * * * *